Oct. 3, 1933.  C. E. MUSGRAVE  1,929,149
AUTOMOBILE BRAKE TESTING DEVICE
Filed June 27 1930    4 Sheets-Sheet 1
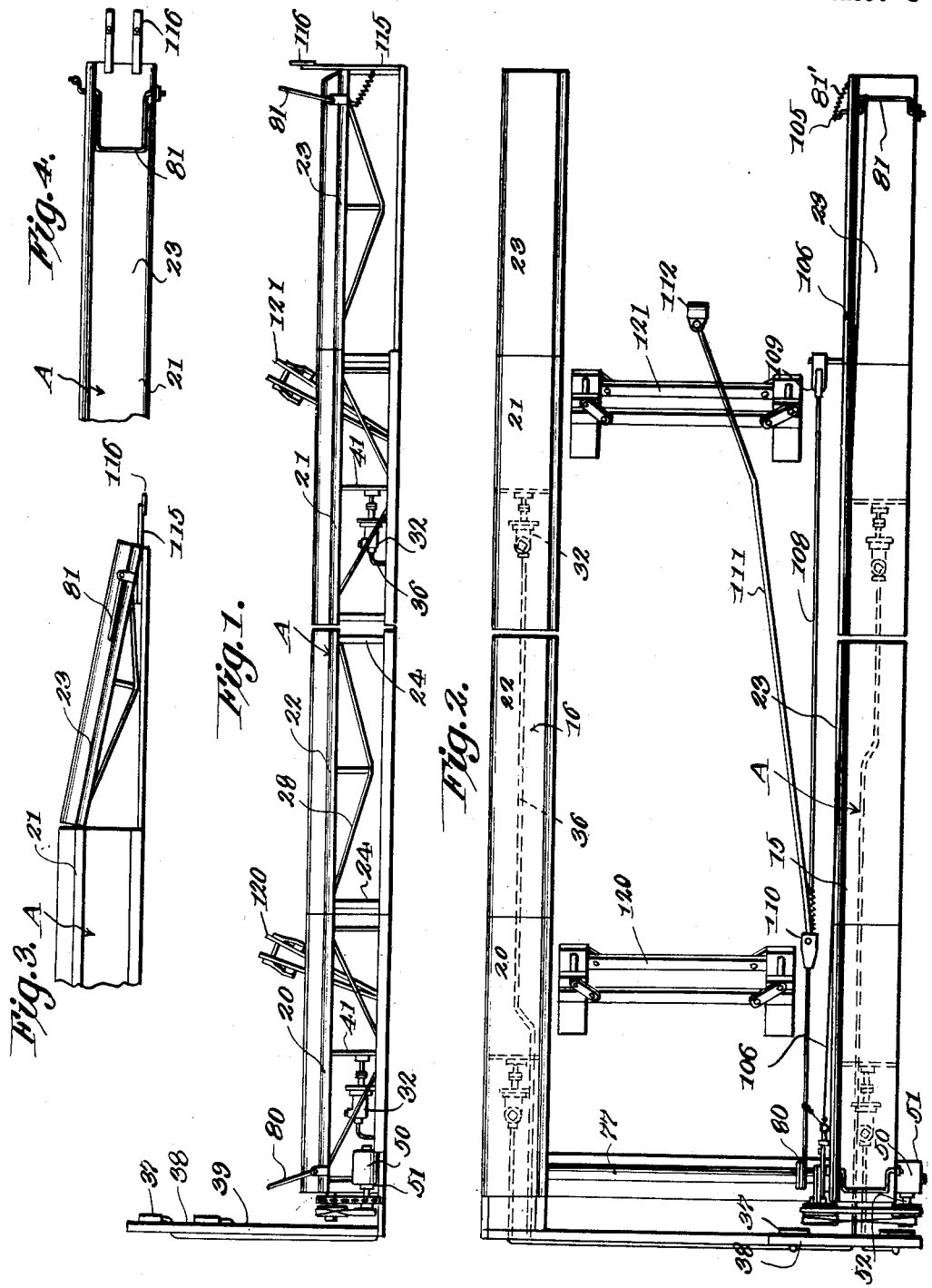
INVENTOR.
CLAUDE E. MUSGRAVE
BY
ATTORNEY

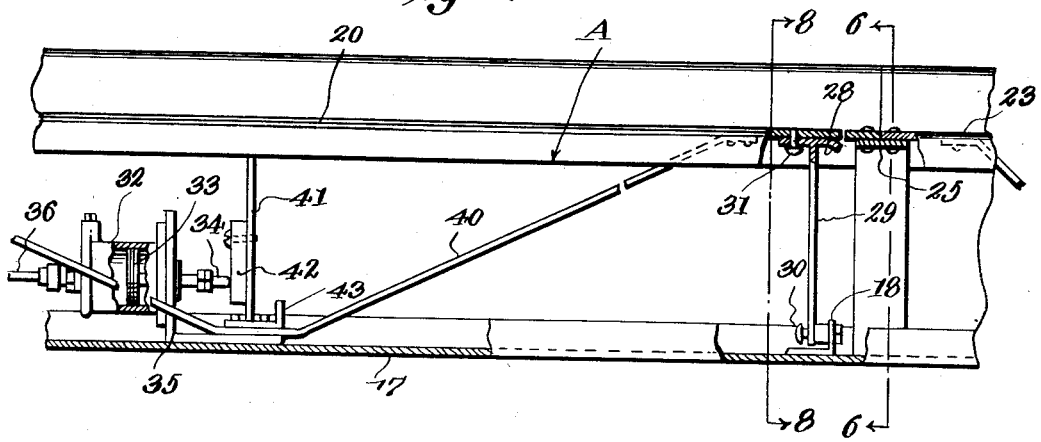

Oct. 3, 1933.        C. E. MUSGRAVE        1,929,149
AUTOMOBILE BRAKE TESTING DEVICE
Filed June 27, 1930        4 Sheets-Sheet 3
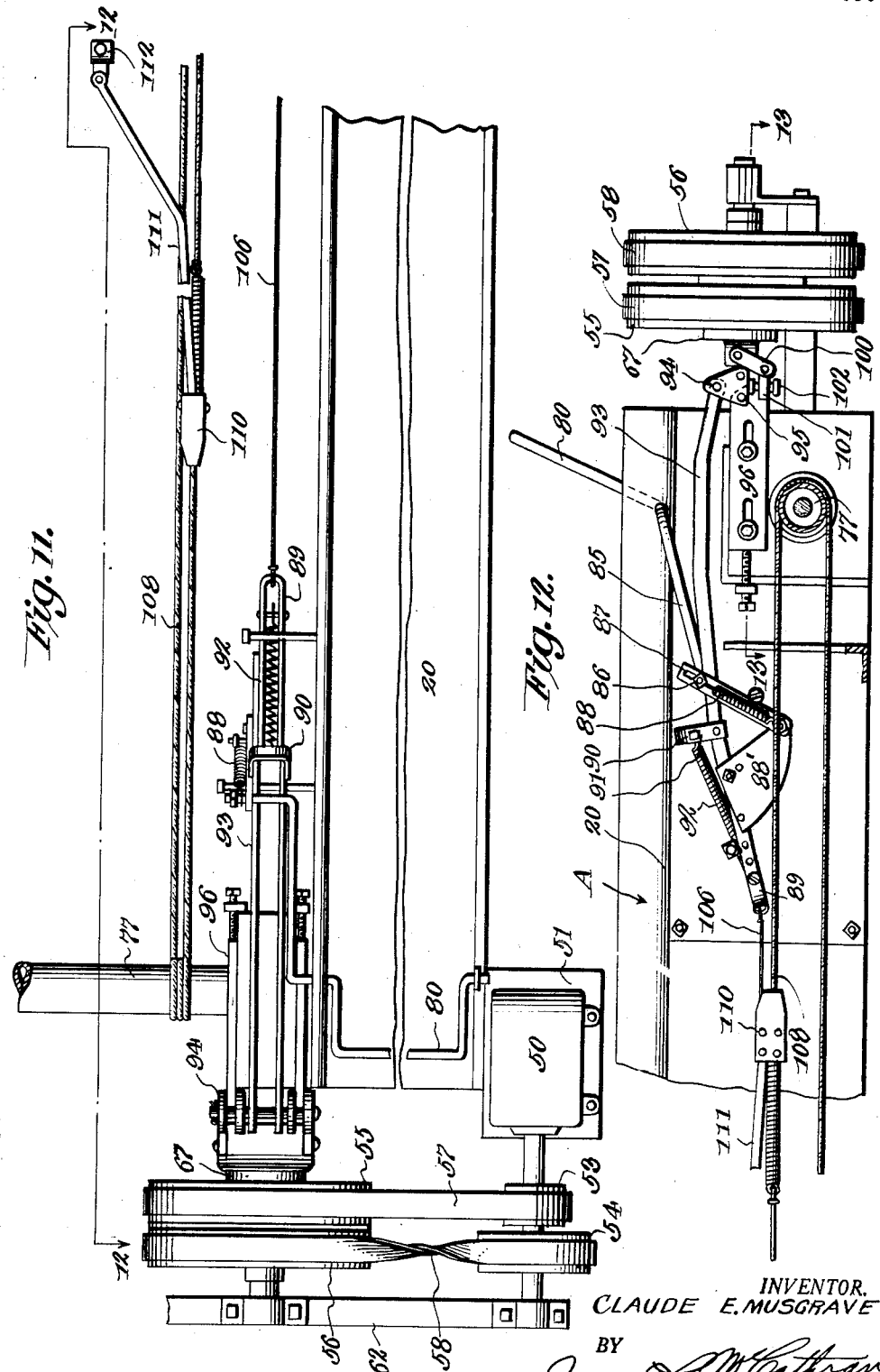
INVENTOR.
CLAUDE E. MUSGRAVE
BY
ATTORNEY

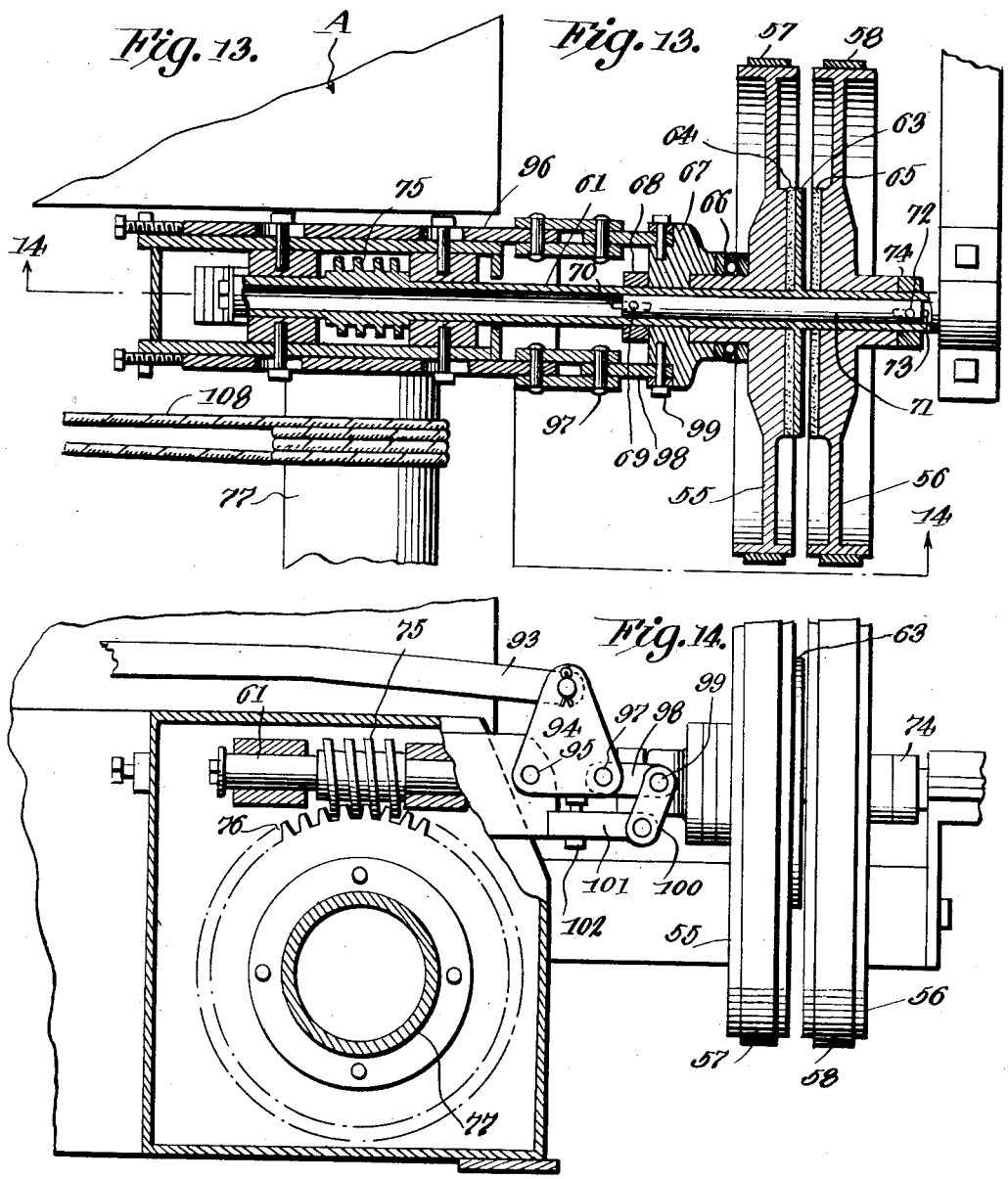

Patented Oct. 3, 1933

1,929,149

UNITED STATES PATENT OFFICE 1,929,149

AUTOMOBILE BRAKE TESTING DEVICE

Claude E. Musgrave, Cedar Rapids, Iowa

Application June 27, 1930. Serial No. 464,334

8 Claims. (Cl. 265—47)

This invention appertains to brake testing machines and more particularly to a device of the type in which the motor vehicle is received in horizontal runways, the wheels of the vehicle acting independently on platforms carried by the runways, each of the platforms being independently connected with gage members in such a manner that the exact braking pressure on each wheel can be instantly and accurately determined.

One of the primary objects of my invention is to provide novel means for pulling the motor vehicle back and forth on the runways so as to permit the effective testing of the brakes, the platforms forming a part of the runways being of such a size as to permit a vehicle wheel to turn one complete revolution thereon, so that the brakes will be tested at all points about the brake drums for determining whether the drums are out of round or not.

Another salient object of my invention is the provision of novel means for constructing and mounting the platforms whereby a sensitive and accurate device will be had, the platforms being of an oscillating cam type and normally disposed in a balanced position and tending to automatically return to a balanced position at the end of the vehicle travel on the runways.

A further important object of my invention is the provision of means for automatically moving the motor vehicle the desired distance back and forth on the runways over the oscillating platforms, novel trips being provided at the end of travel of the motor vehicle both at the front and rear of the machine for automatically reversing the mechanism for moving the vehicle back and forth over the runways.

A further object of my invention is the provision of inclined approaches forming a part of the runways for facilitating the driving of the motor vehicle on the runways, the approaches having novel means for permitting the raising and holding of the same in horizontal alignment with the body portions of the runways when the vehicle is on the runways so that said approaches can form a definite and positive part of the runways when the machine is in use.

A further object of my invention is the provision of means for detachably connecting the pivoted approaches with the outer ends of the runways, so as to permit the removal thereof for reducing the active length of the runways when the machine is not in operation and thereby allowing the use of all available space in a garage for the storing of cars such as in the night time.

A further object of my invention is the provision of means for drawing the vehicle slowly forward over the runways at the time of the brake test and for quickly pulling the vehicle back over the runways to an initial starting brake testing position, whereby a minimum amount of time is employed for the brake test and at the same time allowing full and ample time for the brake test.

A further object of my invention is the provision of novel means for driving the operating drum or reel for the cable employed for pulling the car back and forth on the runways from an electric motor with a novel type of clutch and reversing mechanism therefor interposed between said drum or reel and the operating motor.

A further important object of my invention is the provision of means whereby a motor vehicle can be readily and quickly raised above the runways so as to facilitate repairs and the like being made under the vehicle.

A still further object of my invention is to provide a novel testing machine for the brakes of motor vehicles which will be durable and efficient in use, one that will be simple and easy to manufacture, and to operate, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of my improved brake testing machine with the cover plates removed and the approaches in their elevated position.

Figure 2 is a top plan view of my improved brake testing machine with the approaches in their raised elevated position.

Figure 3 is a fragmentary side elevation showing one end of my brake testing machine with one approach in its lowered inclined position for permitting the riding up of a motor vehicle on the runways.

Figure 4 is a fragmentary top plan view of one runway with the approach in its lowered position.

Figure 5 is an enlarged fragmentary side elevation of one runway showing parts thereof broken away and in section illustrating the novel rocking support for one of the oscillating platforms and the testing cylinder therefor.

Figure 6 is a transverse section taken on the line 6—6 of Figure 5 looking in the direction of the arrows through one of the platforms illustrating the means for detachably connecting the middle sections of the runways in position.

Figure 7 is a horizontal section taken on the line 7—7 of Figure 6 looking in the direction of the arrows illustrating the means for detachably connecting the middle section of the runways in position.

Figure 8 is a transverse section through one runway taken on the line 8—8 of Figure 5 looking in the direction of the arrows illustrating the mounting for one of the oscillating platforms.

Figure 9 is an enlarged fragmentary side elevation of one end of one runway showing parts thereof broken away and in section and illustrating the approach in its raised elevation position.

Figure 10 is an end elevation of one of the runways showing the approach therefor in its raised elevation position.

Figure 11 is an enlarged fragmentary top plan view illustrating my novel operating mechanism for drawing the motor vehicle back and forth over the runways.

Figure 12 is a vertical section taken on the line 12—12 of Figure 11 looking in the direction of the arrows illustrating the mechanism for reversing the drive for the winding drum or spool for the pull cable utilized for drawing the vehicle back and forth over the runways.

Figure 13 is a horizontal section on an enlarged scale taken on the line 13—13 of Figure 12 looking in the direction of the arrows and illustrating the novel reverse clutch mechanism and the operating means therefor, and Figure 14 is a vertical section taken on the line 14—14 of Figure 13 looking in the direction of the arrows illustrating the worm drive from the reverse clutch mechanism through the winding drum or reel with a part of the operating mechanism for the reverse clutch mechanism.

Referring to the drawings in detail, wherein similar reference characters designate corresponding parts throughout the several views, the letter A generally indicates my improved brake testing machine which comprises a pair of spaced runways 15 and 16 upon which the car to be tested is received. The runways 15 and 16 are equally spaced throughout their length and each runway is preferably formed relatively wide to facilitate the driving of a motor vehicle thereon. Each of the runways 15 and 16 include a pair of spaced longitudinally extending base angle bars 17 rigidly connected together at spaced points by transversely extending angle bars 18. This forms a rigid base structure. This base structure of each runway 15 and 16 supports oscillating platforms 20 and 21 located at the front and rear of the runways and an intermediate top section 22. The top faces of the platforms 20, 21, and the intermediate section 22 forms a trackway for the wheels of the motor vehicle and this trackway is relatively wide and is provided with inner longitudinally extending upstanding guide flanges 23 for the wheels of the motor vehicle. The base structure also supports the end approaches 23 which will be later described.

The intermediate sections 22 are preferably detachably secured in place so that these sections 22 can be removed allowing easy access to be had under a motor vehicle when the same is supported by the platforms 20 and 21.

The intermediate sections 22 are rigidly supported relative to the base support and the platforms 20 and 21 rock relative thereto. These intermedite sections 22 can be supported in the following manner. Upstanding end legs can be riveted or otherwise secured to the angle base bars 17 and the upper ends of these legs have secured thereto transversely extending straps or plates 25 provided with key hole slots 26. The ends of the intermediate sections 22 rest on these plates and carry depending headed rivets 27 which can be slipped into the key hole slots 26. It is thus obvious that by moving the intermediate sections laterally in one direction that the same can be detached from the plates 25 and removed from place. The intermediate sections 22 can be braced by a truss structure 28 as shown, if desired.

The rocking or oscillating platforms 21 and 20 are supported in a novel manner, which forms one of the salient features of my invention and this means will now be described.

The opposite ends of the oscillating platforms 20 and 21 rest upon cam shaped shoes 28 formed on the upper end of swinging cam bars 29 which bars extend transversely across the base structure of the runways. The lower ends of the cam bars 29 are connected with the adjacent transversely extending angle bars 18 of the base for limited rocking movement by headed bolts or by means of loose rivets 31, as shown.

It is to be noted that normally the platforms are in a balanced position in that upon forward rocking movement thereof the platforms ride on the arcuate cam faces of the shoes and are slightly raised. Thus the weight on the platforms normally tends to move the platforms back to their normal position. It is well to understand at this point, that the rocking movement of the platforms is exceedingly slight and simply sufficient to allow the operation of the gage mechanism which will now be described.

The gage mechanism is of the hydraulic type and each oscillating platform 20 and 21 has mounted below the same a rigid cylinder 32 having reciprocately mounted therein the compression piston 33 the piston rod 34 of which extends out from one end of the cylinder. This end of the cylinder is bolted or otherwise secured to a supporting plate 35 rigidly bolted or riveted to the longitudinally extending angle bars 17 of the base. Leading from each cylinder 32 is a pressure pipe or tube 36 and each of these pressure pipes leads to an independent gage 37. These gages can be mounted on a suitable display plate 38 connected to standards 39 rigidly secured in any preferred manner to the base of the runways. All of the cylinders and the pipe lines are filled with oil or other hydraulic braking fluid and the pistons 33 act against such fluid.

Each of the oscillating platforms 20 and 21 carry a depending thrust structure 40, the lower central portion of which has connected thereto a short section of an I beam 41, which I beam extends transversely across the rocking platform and is connected to the lower surface thereof. The forward faces of the I beams 41 carry suitable blocks 42 which blocks bear against the outer ends of the piston rods 34. If preferred, means can be provided for initially adjusting the blocks 42 or the piston rods 34 relative to one another so that the blocks 42 will engage the piston rods when the platforms are in their normal position. It is obvious that upon forward rocking movement of the platforms that the beams 41 and the thrust structure 40 will be moved therewith and that the blocks 42 will push against the piston rods, which in turn will register the pressure of the push on the dial gages 37. Rearward swinging movement of the beams 41 is prevented by means of an abutment flange 43 formed on each supporting bracket 45 of the pistons 32 (see Figure 5 of the drawings).

I have provided novel means, which forms another salient feature of my invention, for moving the motor vehicle back and forth over the runways, so as to permit the effective operation of the vehicle wheels on the oscillating platforms. While manual means can be provided for drawing the vehicle back and forth over the runways, I prefer to provide a power mechanism for accomplishing this purpose and in the present illustration I have shown a heavy duty electric motor 50 of the desired rating. The motor 50 can be mounted on a suitable bed 51 secured to the base structure of one runway adjacent to the forward end thereof. The armature shaft 52 of the motor has keyed or otherwise secured thereto a relatively small drive pulley 53 and a relatively large pulley 54 as clearly shown in Figure 11 of the drawings. These pulley wheels 53 and 54 are connected to pulley wheels 55 and 56 respectively by means of a straight pulley belt 57 and a cross pulley belt 58. The pulley wheels 55 and 56 can be of the same diameter but due to the size of the pulleys 53 and 54 the pulley 55 is driven at a less speed than the pulley 56 and the pulley 56 is driven in a reverse direction from the pulley 55 due to the crossed pulley belt 58. These pulley wheels 55 and 56 also constitute a part of my novel clutch reverse mechanism for operating the winding drum or shaft 77, the terminals of which are mounted in bearings carried by the base structure of the runways.

The reverse clutch mechanism comprises a hollow drive shaft 61 extending longitudinally of the runways and at right angles to the winding drum or shaft 77. This hollow shaft is likewise mounted in suitable bearings which can be carried by the base of the runways and in an additional supporting frame structure 62 mounted at the front end of the base of the frame for the runways. This hollow shaft 61 has formed therein or keyed thereto a double faced clutch disc 63 and this clutch disc 63 is arranged between the pulleys 55 and 56, which pulleys are mounted for free rotation on said hollow shaft 61. The inner face of the pulley wheel 55 is provided with a friction clutch face 64 while the pulley wheel 56 is provided with an inner friction clutch face 65. The outer front face of the pulley wheel 55 bears against a thrust bearing 66 which is also engaged by a sliding thrust collar 67, the bearing 66 and the thrust collar 67 being employed for urging the pulley wheel 55 into frictional contact with the clutch disc 63. The opposite face of the thrust collar 67 bears against a thrust ring 68 to which is connected a diametrically extending thrust pin 69 extending through suitable slots 70 formed in the hollow drive shaft 61. This pin 69 extends transversely through an operating rod 71 slidably and rotatably mounted within the hollow shaft 61. The opposite end of this operating rod 71 carries a transversely extending pin 72, the ends of the pins extending through slots 73 formed in said shaft 61 and are connected with a thrust ring 74 for bearing engagement against the hub of the pulley wheel 56. It is thus obvious that when the thrust collar 67 is moved longitudinally away from the pulley wheel 55 in order to permit the disengagement of the clutch face 54 of this pulley wheel from the clutch disc 63, that the collar will engage the clutch ring 68 and slide the operating rod 71 inwardly and to the left, referring to Figure 13. This will carry the thrust collar 74 therewith which will in turn move the pulley wheel 56 into engagement with the clutch disc 63 and drive the clutch disc in a reverse direction and at a higher rate of speed. Keyed or otherwise secured on the shaft 61 is a worm 75 meshing with a worm wheel 76 keyed or otherwise secured to the drum or winding shaft 77. I preferably allow a little loose play between the worm 75 and the bearings for the shaft so as to insure the carrying of the clutch disc into engagement with the clutch faces of the pulley wheels 55 and 66 at the desired time.

It should be understood that the end thrust of the worm 75 is taken care of by the lever 94 and the links 98 pressing against the shaft collar 67 and the wheel 55. The heavier the load or work that is to be done, the tighter the clutch is pulled against the clutch facing and at the same time the clutch is very easily released on the load so that it can be operated with more delicate switch mechanism.

I have provided an automatic means for operating the clutch and this means comprises wheel trips 80 and 81 located at opposite ends of the runways. Each of the trips are of a bail shape and of a substantially inverted U-shaped configuration having formed on the ends thereof bearing arms which are rotatably mounted in suitable bearings carried by the upper face of the runways. It is to be noted that the wheel trip 81 is carried by the extreme outer end of one of the approaches 23 and that this trip can be swung to a complete lowered position in facial abutment with the upper surface of the approach, as shown in Figures 3 and 4 of the drawings, when a vehicle is being driven on the runways.

The wheel trip 80 is provided with a forwardly extending crank arm 85 the outer end of which is connected to a suitable bolt or pin 86 mounted for limited sliding movement in a pull arm 87. This bolt or pin 86 has connected thereto a contractile coil spring 88, the lower end of which is connected to the lower end of said pull arm 87. The lower end of the pull arm is connected to an attaching plate 88' rigidly secured to an operating lever 89. This operating lever is rockably secured to the lower ends of the inverted U-shaped trip member 90 which is rockably mounted intermediate its ends on a pivot bolt or the like 91 carried by one of the runways. The upper end of the trip 90 is connected with the lever 89 adjacent to its outer end by means of a contractile coil spring 92, for a purpose, which will be later described.

Rockably connected to the lower ends of the trips 90 are forwardly projecting operating arms 93 and the forward ends of the operating arms 93 are pivotally connected to the upper ends of a pair of triangular shaped operating levers 94. These levers 94 are rockably mounted on pins 95 adjacent to their inner lower corners, as shown, and these pins are supported by suitable plates or brackets 96 connected to the housing for the worm 75 and the worm wheel 76. It is to be noted that these plates or brackets 96 are adjustable so as to permit the initial setting of the device. It is to be also noted that the triangular operating levers 94 are mounted in pairs on opposite sides of the casing for the worm and worm wheel and that an operating arm 93 is received between each pair. The lower outer corners of the triangular operating levers 94 support pivot pins 97 which pins receive operating links 98 which are in turn connected to pivot pins 99 carried by the thrust collar 67. The pins 99 also slidably and pivotally receive pivot links 100 connected with a flange 101 formed on the supporting plates or brackets 96. The flange 101 also preferably carries a set screw 102 for limiting the downward swinging movement of the triangular levers 94.

The wheel trip 81 likewise has formed on the inner end thereof a crank arm 105 engaged by a spring 81' and this wheel trip 81 is connected by means of a cable 106 with the lower outer end of the swinging lever 89.

Normally the parts are in position as shown in Figures 12, 13, and 14 with the clutch face 64 of the drive pulley 55 in engagement with the clutch disc 53 and thus when the motor switch is closed, drive will be had from the small pulley 53 on the motor shaft, through the straight pulley belt 57, through pulley wheel 55, disc 63, shaft 61, worm 75, worm wheel 76, to the drum or winding shaft 77 which will rotate in a clockwise direction, referring to Figures 12 to 14 inclusive. This winding drum or shaft 77 has coiled thereabout an endless pull cable 108, the opposite end of which is trained about an idle guide pulley 109 carried by the runway at a point spaced from the drum or winding shaft 77. The upper run of the endless cable 108 has rigidly connected thereto by means of a clamp 110 a rigid draw bar rod 111, the outer end of which carries a clamp 112 for engaging a portion of the frame of the automobile above the axle and spring. Thus when the drum 77 is rotating in a clockwise direction the upper run of the endless cable 108 will be paying off from the drum. This will draw the vehicle toward the front end of the runway and when the front wheels strike the trip 80, the same will be rocked forwardly pulling up on the crank arm 85. This pull of the crank arm 85 will, through the spring 88, raise up on the pull arm 87 causing the swinging of the lever 89 to the inner side of the pivot moving the spring 92 past its center causing the rocking of the yoke 90, and the lower end of the yoke will push forwardly on the arms 93, and consequently rock the triangular plates 94 forward. The rearward swinging movement of the triangular plates 94 will pull outwardly on the connecting link 98 drawing the bearing 66 away from the pulley 55 allowing the pulley to disengage the clutch disc 63. Simultaneous with this movement the thrust ring 74 will move the pulley wheel 56 into engagement with the clutch disc 63, by means heretofore described. Consequently the drive will be through the large pulley wheel 54 from the motor shaft to the cross belt 58 to the pulley 56 through the clutch disc 63 driving the same in a reverse direction, through shaft 61, to the drum or winding shaft 77. This drum or winding shaft 77 will now rotate in a counter clockwise direction and at a faster rate of speed than when rotating in a clockwise direction. The lower run of the cable will now be wound up on the drum or shaft 77 which will pull the upper run off of said drum, consequently pulling the draw bar 111 toward the approach end of the runways and thus pulling the vehicle back on the runways.

When the vehicle hits the rear trip (Figure 1) the pull will be exerted on the cord 108 and as this cord is attached to the lever 89, the lever will be swung to its normal position as shown in Figure 12, moving the spring 92 past center and to the left of its pivot causing the yoke 90 to move back to its normal position, which movement pushes forwardly on the arms 93 returning the triangular plates 94 to their normal position and again moving the thrust bearing 66 into engagement with the pulley wheel 55 and the thrust ring 74 out of engagement with the pulley wheel 56. The drum will again rotate in a clockwise direction for pulling the motor vehicle rearwardly on the runways. The motor can be stopped at any time desired during the brake test and after the test is completed.

Referring to the approaches 23, the inner ends of the same are rockably mounted on suitable pins carried by the supporting legs 24 and thus these approaches can be swung to an inclined lowered position as shown in Figure 3 when a vehicle is to be driven on the runways. The outer ends of the approaches carry pivoted plates 115 provided with operating handles 116 adjacent to their upper ends. By this arrangement when a vehicle has been driven on the runways past the approaches the handle 116 can be grasped by the operator so as to swing the approaches to a raised position and move the plate 115 in a vertical position as shown in Figure 9 of the drawings. The lower ends of the plate 115 can be received between a pair of spaced transversely extending straps 117 which hold the plates against further swinging movement. The approaches by this arrangement can be held in the same horizontal plane as the upper surfaces of the runways during the testing of the vehicle. The transversely extending straps 117 are connected to longitudinally extending straps 118 which can be rigidly connected to the spaced angle bars 17 of the runways.

The sides of the runways can be braced by suitable side plates, if desired, and as shown in Figure 3 of the drawings.

In use of my improved testing machine the motor vehicle is driven up on the runways and the approaches are moved to their elevated positions after which the clamp 112 of the draw bar 111 is connected to the frame of the vehicle and the vehicle is pulled forwardly over the runways. When the wheels of the vehicle hit the platforms 20 and 21 the brakes are applied. If the brakes are holding equally all of the platforms 20 and 21 will be rocked equally and the gages 37 operated by the pistons 33 will all indicate the same. Should one or more of the wheels slip in its brake lining the wheel will have a tendency to rotate on the platform and thus not swing the platform forwardly and consequently the gage for this platform will not be operated or operated to the extent of the other platforms. The platforms are of such a length that each wheel can rotate one complete turn thereon so that a brake drum and lining can be tested throughout its entire circumference to see if the brake is slipping at any point or whether the brake drum is out of round. The brakes are not tested on the return movement of the vehicle and consequently this movement is made rather fast to facilitate the speeding up of the brake testing job.

From the foregoing description it can be seen that I have provided a novel brake testing machine which is entirely automatic in nature and which will effectively test all of the brakes separately and independently of each other.

My improved device can be used in the nature of a jack, so that the vehicle can be readily and quickly elevated above the runways to permit repairs and the like to be made under the motor vehicle. This means comprises front and rear jack members 120 and 121 which are placed between the runways as clearly shown in Figures 1 and 2. The lower terminals of these jack members gradually taper for bearing engagement with the floor between the runways and the upper ends of these jacks receive the front and rear axles respectively of the vehicle and in use are preferably placed at an angle of substantially 20°. The machine is now operated in the manner heretofore described and the draw bar 111 will pull the vehicle forwardly and consequently swing the jack members 120 and 121 forwardly and elevate the machine. The pull of the draw bar will hold the vehicle in its elevated position and when it is desired to lower the vehicle it is merely necessary to reverse the machine and allow the vehicle to lower.

Thus it can be seen that I have provided a combination brake testing machine and a vehicle elevating device.

Changes in details may be made without departing from the spirit or the scope of this invention, but:—

What I claim as new is:

1. A machine for testing the brakes of motor vehicles comprising a pair of longitudinally extending spaced runways, each including a front and a rear movable platform for the front and rear wheels respectively of the motor vehicle, means for independently registering the movement of each platform, means for automatically moving the motor vehicle back and forth over the runways, said means embodying a reversing clutch and wheel operated trips for actuating with the clutch arranged at the opposite ends of a runway, and yieldable resisting means normally resisting the movement of said platforms.

2. A machine for testing the brakes of motor vehicles comprising a pair of longitudinally extending spaced runways, each of the same including a front movable platform and a rear movable platform for the front and rear wheels respectively of the vehicle being tested, means for independently registering the movement of each of the platforms, and means for automatically moving the vehicle back and forth on the runways including an electric motor, a winding drum located near the forward end of said runways and arranged near one end of the forward platform having an endless cable with a portion of its length wound thereabout, an idle guide pulley located near the opposite end of the runways relative to the winding drum receiving the end of the cable remote from the drum, a vehicle draw bar connected with the upper run of the cable, a reverse clutch mechanism between the motor and the drum, means for automatically operating the reverse clutch mechanism as the vehicle approaches the end of the runways, and yieldable resisting means for resisting the movement of said platforms.

3. A machine for testing the brakes of motor vehicles comprising a pair of longitudinally extending spaced runways, each of the same including a front movable platform and a rear movable platform for the front and rear wheels respectively of the vehicle being tested, means for independently registering the movement of each of the platforms, means for automatically moving the vehicle back and forth on the runways including an electric motor, a winding drum located near the forward end of said runways and arranged at one end of the forward platform having an endless cable with a portion of its length wound thereabout, an idle pulley located near the opposite end of the runways relative to the winding drum receiving the end of the cable remote from the drum, a vehicle draw bar connected with the upper run of the cable, a reverse clutch mechanism between the motor and the drum, means for automatically operating the reverse clutch mechanism, said means including wheel trips arranged at the opposite ends of one runway, and yieldable resisting means for resisting the movement of said platforms.

4. In a machine for testing the brakes of motor vehicles comprising a pair of spaced longitudinally extending runways, each of the runways including a front and a rear movable platform, means for registering the movement of each platform independently of the other and means for moving a motor vehicle back and forth over the runways including an electric drive motor, having an armature shaft, a pair of pulleys of different sizes on the armature shaft, a drive shaft having a pair of pulleys of the same size rotatably mounted thereon, the inner faces of the last mentioned pulleys being provided with friction discs, a friction disc clutch rotatable with the driven shaft, a straight belt connecting one of the last mentioned pulley wheels to one of the pulley wheels on the motor shaft, a crossed belt connecting the other pulley wheel of the driven shaft to the other pulley of the motor shaft, a winding drum located near the forward end of said runways, an idle pulley located adjacent to the opposite end of the runways from the winding drum, an endless cable trained about the guide pulley having a portion of its length wound upon the drum, a draw bar connected to the upper run of the cable having a clamp for connection with the chassis of the motor vehicle to be tested, a worm on the driven shaft, a worm wheel on the drum, means for maintaining the clutch face of one of the pulleys on the driven shaft in engagement with the clutch disc, means for withdrawing said face from engagement with said pulley and the other pulley on the driven shaft in engagement with the clutch disc rotatable with the driven shaft, and yieldable resisting means for resisting the movement of said platforms.

5. In a machine for testing the brakes of motor vehicles comprising a pair of spaced longitudinally extending runways, each of the runways including a front and rear movable platform, means for registering the movement of each platform independently of the other and means for moving a motor vehicle back and forth over the runways including an electric drive motor, having an armature shaft, a pair of pulleys of different sizes on the armature shaft, a driven shaft having a pair of pulleys of the same size rotatably mounted thereon, the inner faces of the last mentioned pulleys being provided with friction discs, a friction disc clutch rotatable with the driven shaft, a straight belt connecting one of the last mentioned pulley wheels to one of the pulley wheels on the motor shaft, a crossed belt connecting the other pulley wheel of the driven shaft to the other pulley of the motor shaft, a winding drum located near the forward end of said runways, an idle pulley located adjacent to the opposite end of the runways from the winding drum, an endless cable trained about the guide pulley having a portion of its length wound upon the drum, a draw bar connected to the upper run of the cable having a clamp for connection with the chassis of the motor vehicle to be tested, a worm on the driven shaft, a worm wheel on the drum, means for maintaining the clutch face of one of the pulleys on the driven shaft in engagement with the clutch disc, means for withdrawing said face from engagement with said pulley and the other pulley on the driven shaft in engagement with the clutch disc rotatable with said driven shaft, said means embodying an operating lever, a pivoted trip carried by the forward end of one runway for operating the lever in one direction a trip carried by the opposite end of the mentioned runway for operating the lever in the opposite direction, and yieldable resisting means for resisting the movement of said platforms.

6. In a brake testing machine, a pair of longitudinally extending equi-distantly spaced runways, each of the runways including movable platforms, means for rockably supporting the platforms, each of said means including a pair of cam plates having a cam shoe engaging the platforms, means rockably connecting the cam shoes with the platforms, and means rockably supporting the lower ends of the cam plates, the cam plates being normally in a balanced position.

7. In a brake testing machine, a pair of longitudinally extending equi-distantly spaced runways, each of the runways including movable platforms, means for rockably supporting the platforms, each of said means including a pair of cam plates having a cam shoe engaging the platforms, means rockably connecting the cam shoes with the platforms, means rockably supporting the lower ends of the cam plates, the cam plates being normally in a balanced position, and means for independently registering the movement of each platform including a cylinder for each platform, a piston movable in the cylinder, a gage, a feed pipe connecting one end of the cylinder with its gage, a liquid in the cylinder forwardly of the piston, a depending switch plate carried by each cylinder having a bearing block engaging the rod of the piston, a thrust structure carried by the lower face of each platform engaging the lower end of the switch plate.

8. In a machine for testing the brakes of motor vehicles comprising a pair of spaced longitudinally extending runways, each of the runways including a front and rear movable platform, means for registering the movement of each platform independently of the other and means for moving a motor vehicle back and forth over the runways including an electric drive motor, having an armature shaft, yieldable resisting means for resisting movement of said platforms, a pair of pulleys of different sizes on the armature shaft, a driven shaft having a pair of pulleys of the same size rotatably mounted thereon, the inner faces of the last mentioned pulleys being provided with friction discs, a friction disc clutch rotatable with the driven shaft, a straight belt connecting one of the last mentioned pulley wheels to one of the pulley wheels on the motor shaft, a crossed belt connecting the other pulley wheel of the driven shaft to the other pulley of the motor shaft, a winding drum located near the forward end of said runways, an idle pulley located adjacent to the opposite end of the runways from the winding drum, an endless cable trained about the guide pulley and wind drum, a draw bar connected to the upper run of the cable having a clamp for connection with the chassis of the motor vehicle to be tested, a worm on the driven shaft, a worm wheel on the drum, means for maintaining the clutch face of one of the pulleys on the driven shaft in engagement with the clutch disc, means for withdrawing said face from engagement with said pulley and the other pulley on the driven shaft in engagement with the clutch disc rotatable with the driven shaft, said means embodying an operating rod slidable longitudinally of the driven shaft having thrust collars on the opposite ends thereof for engagement with the pulleys on the driven shaft, rockable triangular shaped levers connected to one thrust collar, an operating lever, a pivoted trip carried by the forward end of one runway for operating the lever in one direction and a trip carried by the opposite end of the mentioned runway for operating the operating lever in the opposite direction, a draw bar operatively connecting the operating lever with the triangular shaped levers, the driven shaft having play therein, whereby the worm and worm wheel will turn, through the medium of the triangular shaped levers and the link, the clutch faces in intimate tight contact with one another.

CLAUDE E. MUSGRAVE.